H. N. ANDERSON.
GEAR ROLLING MACHINE.
APPLICATION FILED NOV. 11, 1913.
1,240,914.
Patented Sept. 25, 1917.
2 SHEETS—SHEET 1.
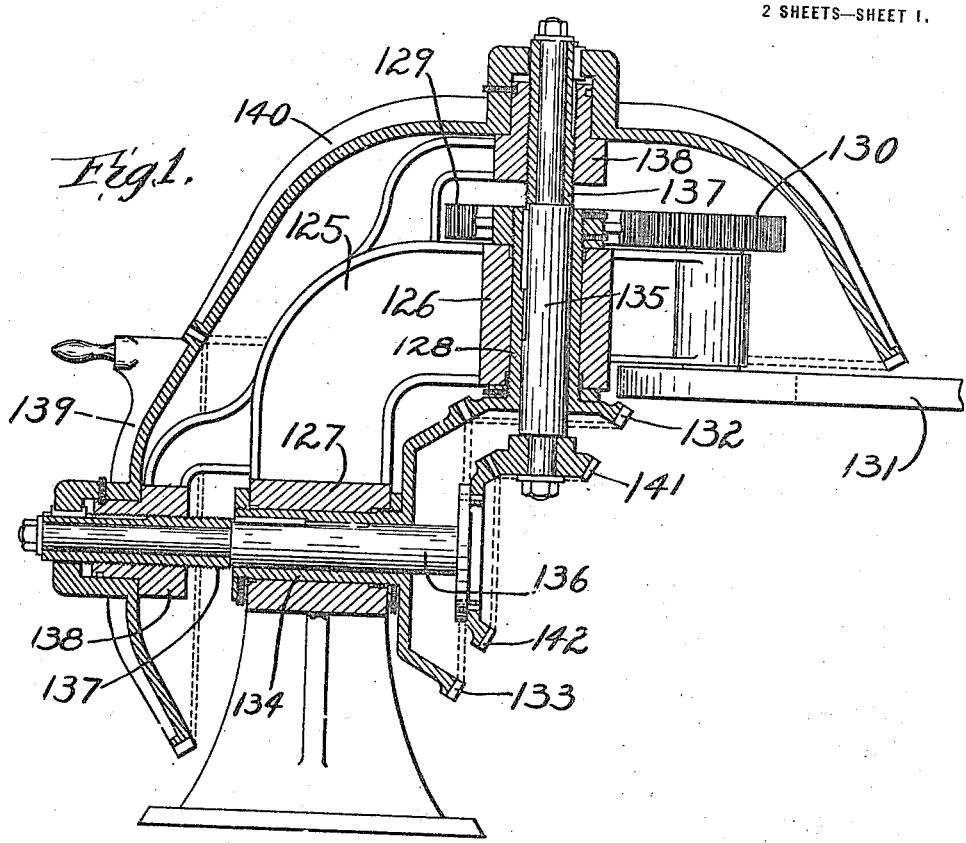
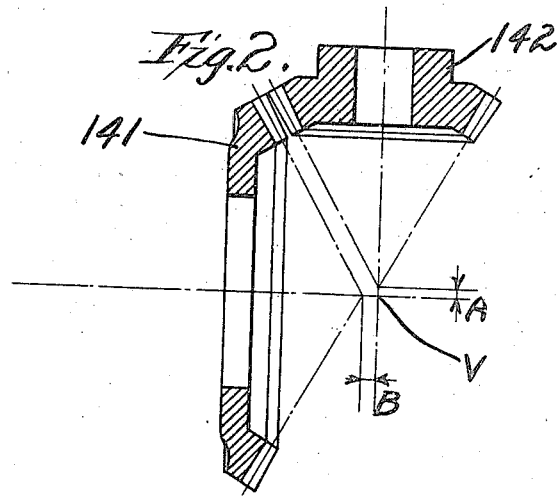
Witnesses
C. H. Kruger
F. H. Fassett
Inventor
Harold N. Anderson
By Kerr, Page, Cooper & Hayward
Attorneys

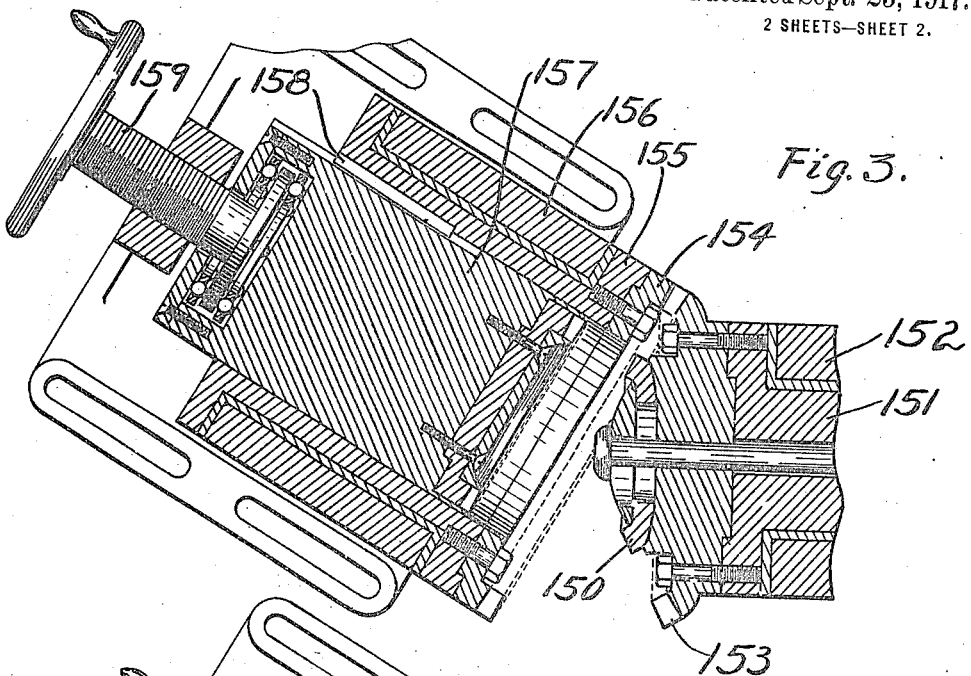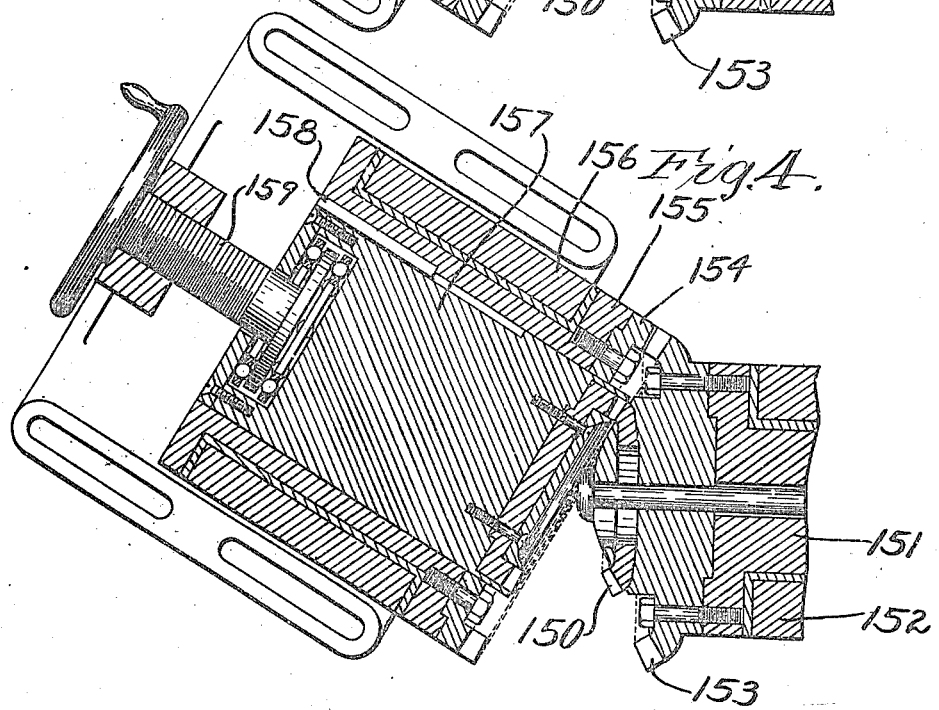

UNITED STATES PATENT OFFICE.

HAROLD N. ANDERSON, OF CLEVELAND, OHIO, ASSIGNOR TO THE ANDERSON ROLLED GEAR COMPANY, OF CLEVELAND, OHIO, A CORPORATION OF OHIO.

GEAR-ROLLING MACHINE.

1,240,914. Specification of Letters Patent. Patented Sept. 25, 1917.

Application filed November 11, 1913. Serial No. 800,251.

*To all whom it may concern:*

Be it known that I, HAROLD N. ANDERSON, a citizen of the United States, residing at Cleveland, in the county of Cuyahoga and State of Ohio, have invented certain new and useful Improvements in Gear-Rolling Machines, of which the following is a full, clear, and exact description.

My invention relates to machines for forming teeth on gears by rolling blank gears against a die roll having a working face complementary in essential particulars to the form it is desired to impart to the blank. The die roll may be a counterpart of the gear the blank is designed to mesh with, or it may be a roll which, though not like the gear the finished blank will be mated with, is capable of forming teeth of the desired form and size on the blank. The embodiments of my invention herein shown are only adapted to roll teeth on bevel gears, but it is not therefore to be inferred or understood that the invention is limited to that use.

The principal advantages derived from rolling teeth on gears are: First; the metal in the teeth, and in the part of the gear adjacent to the teeth, is thereby rendered very dense and fine grained. Second; the grain, or fiber, of the metal is made to follow the contour of the teeth to a considerable extent, giving them very great strength. Third; a high degree of accuracy, both as to size and form of teeth, is assured. Fourth; gears can be produced by this method at a much smaller cost than by any other. This is particularly true of bevel gears, the production of which has in the past been very expensive. Fifth; gears may be made of materials which cannot be made into gears by any other process. Sixth; gears made of materials which are hardened by sudden chilling; such, for example, as high carbon steel, may be hardened to a considerable extent while they are being rolled. The die roll may be kept at a chilling temperature by a jet of cold air or water for this purpose.

While the valuable qualities of rolled gears are primarily due to the fact that they are rolled, these qualities, or at least part of them, are only attainable by maintaining synchronous relations between the teeth on the die roll and the developing teeth on the blank while the latter are being formed. This synchronism may be maintained by driving the blank at such velocity that the imaginary line which, when the gear is finished, will be known as its pitch-line will move, from the beginning to the end of the tooth-forming operation, at the same velocity as the pitch-line of the die roll. Each of the structures herein shown is provided with means for this purpose.

In the accompanying drawings:

Figure 1 is a sectional elevation of one embodiment of my invention.

Fig. 2 is a diagrammatic view to demonstrate the relative movements of the die roll and blank in the machine illustrated in Fig. 1.

Fig. 3 is a sectional plan of another embodiment of my invention.

Fig. 4 is a view similar to Fig. 3, except that the die is in contact with the blank.

Before proceeding to the detailed description of these machines the following brief explanation of bevel gears will make the subject more easily understood: The teeth of bevel gears are constructed on imaginary pitch cones in the same way that the teeth of spur gears are constructed on imaginary pitch cylinders. The pitch cones of a pair of bevel gears would, if mounted on shafts in place of the bevel gears, drive each other by frictional contact in the same velocity ratio as given by the bevel gears themselves. The angle formed by the axis and one side of the pitch cone is called the pitch cone angle, and the sum of the two pitch cone angles equals the center angle. The center angle equals the angle formed by the axes of the cones, measured on the side on which the contact between the cones takes place. The pitch diameter is the diameter of the base of the cone, and since the pitch of a bevel gear is measured on a circle of the same diameter, "pitch circle" will be understood to mean a circle of the same diameter as the base of the cone. The pitch cone radius is the distance from the apex of the cone to the perimeter of its base. Treating the pitch circle as the perimeter of a plane, this imaginary plane will hereinafter be called the pitch plane of the gear.

Referring now to Fig. 1, 125 is a frame carrying bearings 126 and 127. A sleeve 128 is arranged to rotate in bearing 126, and is provided with a rigidly attached gear 129 which meshes with a driving gear 130, the latter in turn being driven by a belt 131. The lower end of the sleeve terminates in a timing gear 132, which meshes with a timing gear 133 carried by a sleeve 134 journaled in bearing 127. Each of the sleeves has within it a shaft,—135 and 136 respectively,—capable of longitudinal movement, but which, by means of splines, is made to rotate in unison with the sleeves. The outer end of each shaft is reduced in diameter and passes through a sleeve 137, a nut and washer at the end of each shaft preventing longitudinal movement of the shaft with reference to the sleeve. That is, each sleeve is confined between the washer and the shoulder formed by reducing the diameter of the shaft. The sleeves are threaded and screw into threaded hubs 138 carried by the frame 125. Outside of the hubs each sleeve 137 is connected by a spline to a bevel gear,—139 and 140 respectively,—said gears being mounted to rotate on portions of the hubs extending beyond the frame. A set screw entering a groove in the hub which carries it keeps each bevel gear in place. Rotation of the gear 139 rotates the sleeve 137, which, being screwed into the hub 138, causes longitudinal movement of the sleeve and of the shaft 136 within it. At the same time, through the medium of gear 140 and the upper threaded sleeve 137, shaft 135 will be moved longitudinally. Obviously, if the lead of the threads on the sleeves 137 is the same the relative distance the shafts move will be inversely proportional to the velocity ratio of gears 139 and 140. One of the shafts carries a die roll 141, and the other a blank 142. The sleeves 128 and 134 being immovable longitudinally the depth of enmeshment of the teeth of gears 132 and 133 does not vary as the shafts 135 and 136 advance longitudinally. The pitch-line velocity of the gears 132 and 133 being maintained without variation, it follows that the linear velocity of the pitch-line of the die-roll 141 must be the same as that of the blank, i. e., of the imaginary line which will be its pitch-line when it becomes a finished gear, all of the time the teeth are being rolled. Synchronism is therefore maintained between the teeth on the die-roll and the teeth it is forming on the blank.

Fig. 2 shows, diagrammatically, the relative movement required of the die-roll and blank to make the approach perpendicular to their pitch-cone radii. Assuming that their radii are equal they must move respectively distances A and B in order that their vertexes may arrive at the point V at the same time. To bring this about, assuming that the lead of the threads on sleeves 137 is the same, it is only necessary to make the ratio of the diameter of gear 139 to that of gear 140 as distance A is to distance B. Then the approach of each vertex to point V will be at such relative velocity that there will be no radial displacement of either the die-roll or blank, one with reference to the other. The effect, therefore, is just the same as though they were moving toward each other along a line perpendicular to their pitch-cone radii.

The most common form of bevel gear is that already described, in which the teeth are formed on an imaginary cone, the pitch-cone angle being less than 90 degrees. Increasing the number of teeth, the pitch and radius remaining the same, increases the pitch-cone angle, and when the angle becomes 90 degrees the gear is what is known as a crown gear. The pitch-cone angle being 90 degrees the cone has in fact been replaced by a pitch-plane, this plane, of course, being perpendicular to the axis of the gear. In the machine shown in Figs. 3 and 4 the die-roll and one of the timing gears is a crown gear. In this machine the blank 150 is secured in a recess formed in the timing gear 153, said gear being mounted on a shaft 151 arranged to rotate in a bearing 152. The other timing gear, 154 a crown gear, is mounted on a tubular shaft 155, which rotates in a bearing 156. The die-roll, also a crown gear, is carried by a shaft 157 which is made to rotate in unison with shaft 155 by means of a spline 158, while free to move longitudinally therein. Longitudinal movement is imparted to it by the hand screw 159. Bearings 152 and 156 are secured to a base (not shown) and shaft 152 is rotated by means also not shown. Synchronism is maintained between the die-roll teeth and the developing teeth on the blank by the gears 153 and 154, whose depth of enmeshment is not disturbed by the movement of the die-roll. Since the pitch-radius of the die-roll is perpendicular to its line of movement it is only necessary to mount the blank with its pitch-cone radius perpendicular to the axis of the die-roll to insure movement of approach between the die-roll and blank perpendicular to the pitch-cone radii.

It will be obvious to any skilled mechanic that the die-roll and blank may, by very simple modifications in the means for connecting them to their respective timing gears, be transposed. For example, in Fig. 1 the die-roll might be mounted on shaft 136 and the blank on shaft 135. Or in Figs. 3 and 4 the blank might be mounted on shaft 157 and the die-roll, an ordinary bevel gear, on shaft 151, in which the blank would be a crown gear when finished. Furthermore, two gears adapted to run together might be mounted in place of the blank and die-roll, respectively, and run together for the purpose of smoothing up or polishing their teeth. Gears which have warped slightly in hardening might by this means be restored. If necessary an abrasive may be applied to the teeth while the gears are being run together.

Although I have disclosed the preferred embodiment of my invention it is not to be inferred that its application is limited thereto. It is limited only by the scope of the appended claims. What I claim is as follows:

1. In a gear rolling machine, a longitudinally movable die-roll adapted to roll teeth on gears, a longitudinally movable blank holder, means for moving them longitudinally, and means for compelling their longitudinal movement to be at a predetermined relative velocity.

2. In a gear rolling machine, a longitudinally movable die-roll adapted to roll teeth on a gear, a longitudinally movable blank holder, means for moving them longitudinally, and means for compelling their longitudinal movement to be at different velocities but at a predetermined ratio.

3. In a gear rolling machine, a longitudinally movable die-roll adapted to roll teeth on gears, a longitudinally movable blank-holder, means for rotating them at uniform velocity ratio concurrently with their longitudinal movement, means for moving them longitudinally, and means for compelling said longitudinal movement to be at a predetermined relative velocity.

4. In a gear rolling machine, a pair of bevel gears rotatably mounted with their teeth enmeshed, a toothed die-roll arranged to rotate in unison with and on the same axis as one of said gears, a blank-holder arranged to rotate in unison with and on the same axis as the other gear, means for moving the die-roll and blank-holder simultaneously longitudinally with reference to said gears, said means compelling the longitudinal movement to be at a predetermined velocity ratio.

5. In combination, a pair of bevel gears rotatably mounted with their teeth enmeshed, a shaft in each gear whose axis coincides with the axis of the gear, said shafts being adapted to slide longitudinally with reference to the gears but splined so as to rotate in unison therewith, and means for moving the shafts simultaneously in the gears at a predetermined relative velocity.

6. In combination, a frame, a pair of bevel gears rotatably mounted therein with their teeth enmeshed, a shaft in each gear whose axis coincides with the axis of the gear, the shafts being splined and adapted to slide longitudinally in the gears while rotating in unison therewith, a sleeve on and arranged to move longitudinally in unison with each shaft, said sleeves being rotatable independently of the shafts and having threads on their outsides enabling them to screw into threaded holes in the frame, and a gear arranged to rotate each sleeve in the threaded holes, said gears being enmeshed to an invariable depth.

7. In a gear rolling machine, a longitudinally movable die-roll adapted to roll teeth on a bevel gear, a longitudinally movable blank-holder, means for moving them longitudinally concurrently with their rotation, and means for preventing radial displacement of the die-roll and blank, each relative to the other, during said longitudinal movement.

8. In a gear rolling machine, a longitudinally movable die-roll adapted to roll teeth on a bevel gear, a longitudinally movable blank-holder, means for rotating them and concurrently moving both longitudinally for the purpose of rolling teeth on a blank carried by the blank holder, means for compelling said longitudinal movement to be at a predetermined relative velocity, and means for maintaining synchronous relations between the teeth on the die-roll and the developing teeth on the blank.

9. In a gear rolling machine, means for supporting a blank, a die-roll, means for moving the die-roll longitudinally for the purpose of pressing it against the blank, and means for imparting relative movement between the die-roll and blank whereby they are rolled against each other.

10. In a gear rolling machine, rotatable means for supporting a blank, a die-roll, means for moving the die-roll longitudinally for the purpose of pressing it against the blank, and means for rotating the die-roll contemporaneously with said longitudinal movement.

11. In a gear rolling machine, means for supporting a blank, a die-roll, means for moving it longitudinally to press it against the blank, means for rotating the die-roll and blank, and means for maintaining fixed velocity ratio between them.

12. In a gear rolling machine, means for supporting a blank, a die-roll, means for moving it longitudinally and pressing it against the blank, means for imparting relative movement between the die-roll and blank whereby the die-roll and blank are made to roll against each other, and means for maintaining synchronous relations between the teeth on the die-roll and those it is forming on the blank.

13. In a gear rolling machine, means for supporting a blank, a die-roll, means for imparting relative movement between the die-roll and blank, said movement including longitudinal movement of the die-roll, whereby the die-roll teeth are pressed into and made to form teeth on the blank, and means for preventing radial displacement of the die-roll and blank, each relative to the other.

14. In a bevel-gear rolling machine, means for supporting a blank, a die-roll, means for rotating the die-roll and blank, means for contemporaneously producing relative movement of approach whereby the die-roll teeth are pressed into the blank, and means for causing said movement of approach to be perpendicular to the pitch-cone radii.

15. In a bevel-gear rolling machine, means for supporting a blank, a die-roll mounted with its pitch-cone radius parallel to what will be the pitch-cone radius of the finished blank, means for rotating the die-roll and blank, means for contemporaneously producing relative movement between the die-roll and blank whereby the teeth of the former are pressed into the latter, and means for causing said approach to be perpendicular to said pitch-cone radii.

16. In a machine for rolling bevel gears, a pair of gears rotatably mounted with their teeth enmeshed, a blank-holder mounted to rotate in unison with one of said gears, a longitudinally movable die-roll mounted to rotate in unison with the other gear, means for imparting relative movement, including longitudinal movement of the die-roll, whereby the die-roll is made to roll teeth on the blank, and means for preventing radial displacement of the die-roll and blank each relative to the other.

17. In a bevel gear rolling machine, a pair of gears rotatably mounted with their teeth enmeshed, a blank-holder mounted to rotate in unison with one of the gears, a die-roll mounted with its pitch-cone radius parallel to what will be the pitch-cone radius of the finished blank, and arranged to rotate in unison with the other gear, means for rotating the gears, means for producing relative movement of approach whereby the die-roll and blank may be brought into contact and teeth formed on the blank, and means for causing said approach to be perpendicular to said pitch-cone radii.

18. In a gear rolling machine, rotatable means for supporting a blank, a conical die-roll, means for rotating the die-roll and blank, means, comprising longitudinal movement of the die-roll, for producing relative movement of approach between the die-roll and blank, for the purpose of pressing the die-roll teeth into and forming teeth on the rotating blank, and means for maintaining synchronous relations between the die-roll teeth and the developing teeth on the blank.

In testimony whereof I affix my signature in the presence of two subscribing witnesse

HAROLD N. ANDERSON.

Witnesses:
R. M. Calfee,
F. A. Banker.